Nov. 11, 1958     O. J. PATIN     2,859,792
RIM FOR TUBELESS TRUCK TIRES

Filed Oct. 26, 1955     2 Sheets-Sheet 1

INVENTOR.
ONEIL J. PATIN
BY
ATTY.

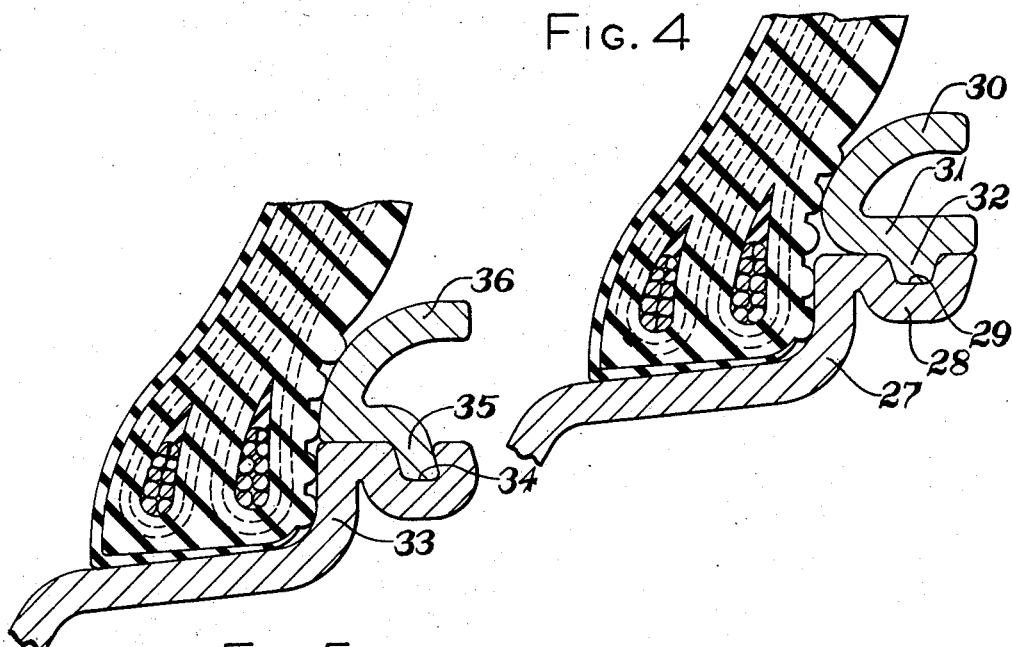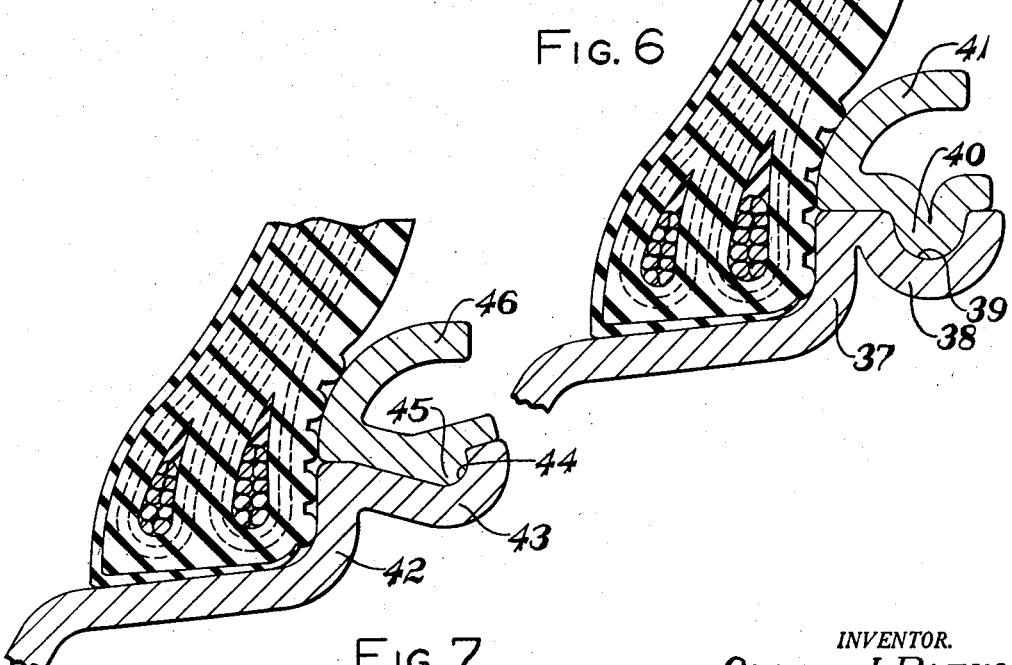

United States Patent Office 2,859,792
Patented Nov. 11, 1958

2,859,792

RIM FOR TUBELESS TRUCK TIRES

Oneil Joseph Patin, Akron, Ohio, assignor to The B. F. Goodrich Company, New York, N. Y., a corporation of New York Application October 26, 1955, Serial No. 542,950

15 Claims. (Cl. 152—406)

This invention relates to an improved rim for inflatable tubeless tires and to the combination of such a rim and tire. More particularly, the invention relates to an improved rim for, and the assembly therewith of, tubeless tires of the larger sizes employed for trucks, buses and the like.

The advantages of inflatable tubeless tires with respect to less upsprung weight, less heat build-up and less danger of blow-outs as compared to tires with tubes, make tubeless tires highly desirable for use on trucks, buses, and similar vehicles. However, the rims normally provided on the wheels of such vehicles, especially those employing tires of the larger sizes, are generally made in more than one piece with the regions of division being so located that the rim is not air-tight thereby preventing its use as a part of the air-chamber for the tire.

In an effort to secure the necessary air imperviousness of truck and bus rims to permit the use of tubeless tires thereon, various proposals have been made for altering the nature of such rims. One such proposal is to form the rim in one-piece and employ a drop center construction similar to the rims for passenger cars. However, the beads and side walls of truck and bus tires are quite stiff so that it is extremely difficult if not impossible to pass the beads over the side flanges of drop center rims if these be made high enough to withstand the lateral forces exerted on the tire during inflation and use. Therefore, the drop center rim for truck tires which is presently being employed has the side flanges lower than would be provided if the rims were proportioned similar to those for passenger cars. To compensate for the low flanges, the bead seats have three times the usual taper in order that the sealing and holding actions may be primarily provided between the tire bead bases and the bead seats. This requires a correspondingly large taper for the bead bases of the tire which in turn introduce difficulty in the building and molding of the tires. Moreover, the sealing action and resistance to lateral forces afforded by surfaces tending to slide over each other, as is the case in such a tire and rim assembly, are less satisfactory than when these functions are provided primarily by abutting surfaces between the outer faces of the tire beads and the side flanges.

The principal object of this invention is therefore to provide an improved rim for inflatable tubeless tires, of the sizes employed for trucks, buses and the like, which cooperates with a tire mounted thereon to form an air-chamber sealed at the lateral outer sides of the tire beads, at least one side flange of the rim having a removable portion to facilitate mounting and demounting of the tire with the line of separation between the integral and removable portions of the flange being located outwardly of the region of sealing between the tire and rim.

Another object of the invention is to provide an improved drop center rim for tubless tires of the size employed for trucks, buses, and the like, characterized by the said rim having bead seats of conventional taper and with at least one side flange of the rim circumferentially divided, the integral portion of said divided side flange being of sufficient height to provide an air seal between the tire and this portion of the flange by the lateral pressure of the tire bead thereagainst.

A more specific object of the invention is to provide an improved rim as defined in the proceeding paragraph wherein the height of the integral portion of the divided side flange is in the order of one-half the total height of the flange.

A still more specific object of the invention is to provide an improved rim as defined above wherein the integral and removable portions of the divided flange have axially extending portions provided with complementary inter-engaging surfaces to retain them in assembled relationship when a tire mounted on the rim is inflated.

The invention also has as an object thereof the provision of an assembly of a rim with an inflatable tubeless tire thereon suitable for use with trucks, buses or the like and wherein the air-chamber is provided in part by an undivided portion of the rim and in part by the tire mounted thereon, at least one side flange of the rim being circumferentially divided at a location radially outwardly of the region of sealing of the two parts of the air-chamber, to thereby facilitate mounting and demounting of the tire, and with the said removable flange portion having an axially extending part provided with a circumferentially extending surface engaging a complementarily shaped surface on an axial projection of the integral portion of the divided flange to retain the removable portion in place when the tire is mounted and inflated.

The invention further resides in certain novel features of the combination and arrangement of parts of the structure in which the invention is embodied, and further objects and advantages thereof will be apparent to those skilled in the art to which the invention pertains from the following description of the presently preferred embodiment of the invention, and certain modifications thereof, taken in conjunction with the accompanying drawings, forming a part of this application, in which:

Fig. 4 is a fragmentary transverse sectional view through one side flange and bead seat of another embodiment of the invention; and Figs. 5, 6 and 7 are views similar to Fig. 4, but each illustrating a different embodiment of the invention.

Figure 1:
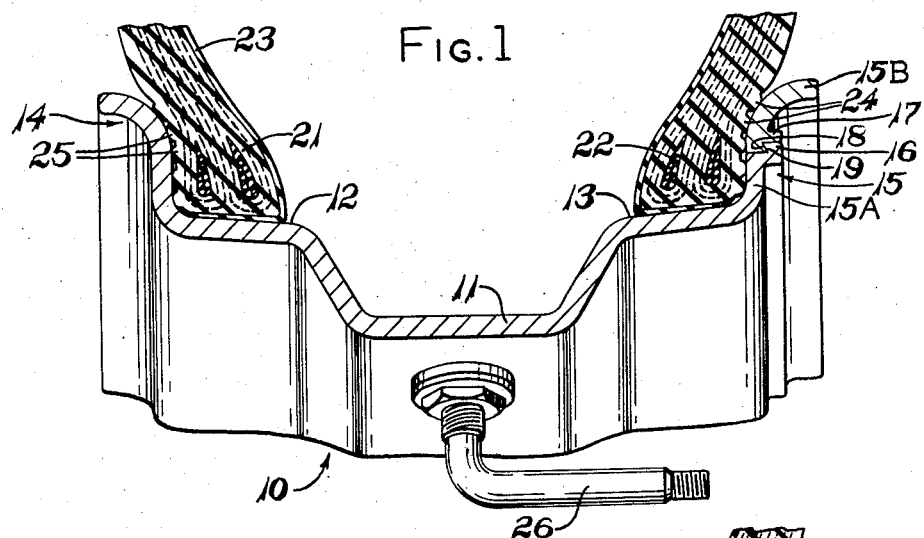
Fig. 1 is a fragmentary transverse sectional view through the presently preferred embodiment of a rim constructed in accordance with the invention and showing a tubeless tire mounted thereon.
Figure 3:
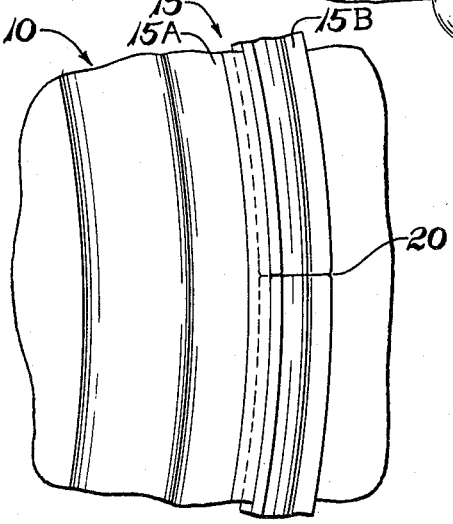
Fig. 3 is a detached fragmentary view in side elevation of a portion of the tire and rim assembly shown in Fig. 1 illustrating the radial division of the removable portion of the flange.

Referring first to Figs. 1 and 3 of the drawings, the presently preferred embodiment of the invention is shown as comprising a drop center rim 10 having a base portion provided with a center recess or well portion 11 and laterally spaced bead seats 12 and 13. These bead seat portions of the rim merge with generally radially outwardly extending side flanges 14 and 15. The bead seats have a taper in the order of 5° and their locations relative to the well or recess portion 11 and to the side flanges, as well as the general shape of the rim, are similar to the constructions employed for passenger cars, modified only to the extent necessary to accomodate tires of the larger sizes customarily employed on trucks, buses and similar vehicles. In the embodiment of the invention shown in Figs. 1 and 3, one side flange, such as 14, is integral with the rim base while the other side flange 15 is circumferentially divided intermediate its outer edge and the adjacent bead seat 13. The lower or inner portion 15A of this side flange is therefore integral with the main part or base of the rim, while the outer portion 15B of this side flange is removable.

The two portions 15A and 15B of the divided side flange are provided with axially extending portions 16 and 17, respectively, each of which portions is provided with radially offset axially extending cylindrical surfaces joined by a circumferentially extending generally radial surface or shoulder 18 and 19, respectively. The said generally radial surfaces or shoulders are complementarily shaped and interengage to thereby provide a locking action retaining the removable portion 15B in place on the rim. As here shown, these complementarily shaped surfaces are under cut with engagement and disengagement of the surfaces, for mounting and demounting of the removable portion 15B, being facilitated by providing a radial split or division 20 in the said removable flange portion 15B, see Fig. 3.

The tire employed with the rim 10 is of generally conventional construction utilized for truck tires and has an annular carcass substantially C-shaped in cross-section with spaced apart, reinforced beads 21 and 22, the axial bases of which have a taper corresponding to the taper of the bead seats 12 and 13 to facilitate seating thereon. While the tire is of generally conventional construction with regard to the number and location of carcass plies, bead cores and the like, it is of the tubeless type and hence preferably is provided with a substantially air-impervious liner 23, which may be formed of butyl rubber or other satisfactory material as is now well understood in the art of tire manufacture. Also, the outer surfaces or faces of the tire beads on the radially extending sides thereof are provided with circumferentially extending sealing means for engagement with the adjacent side flanges of the rim to effect an air seal therewith under the force of the lateral pressure exerted by the air contained in the chamber formed by the tire and rim. Preferably, and as here shown, the sealing means comprise a plurality of spaced circumferentially extending annular projections or ribs 24 and 25 of the type disclosed in U. S. Patent 2,587,470.

A tubeless tire of the type described above is mounted upon the rim shown in Figs. 1 and 3 by removing the side flange portion 15B after which the beads of the tire readily are placed on the bead seats 12 and 13 of the rim by passing the beads sequentially over the relatively low integral flange portion 15A and utilizing the well or recess in a manner which will be readily understood by those familiar with the mounting of tires upon drop center rims. After the tire has been placed upon the rim 11 but before the bead 22 is fully seated, the removable side flange portion 15B is replaced with the complementary surfaces 18 and 19 in interlocking engagement, this operating being facilitated by the radial split 20 of this portion of the side flange. The beads of the tire are then fully seated and moved to sealing engagement with the side flanges of the rim, thereby occupying the positions shown in Fig. 1 and fluid under pressure is supplied to the air chamber formed by the rim and tire carcass through a conventional valve means 26, which is provided in sealing engagement with an opening in the rim. The valve and its mode of mounting are conventional so that these features will be readily understood without detailed description. It will also be apparent that, while the valve is shown as located at the bottom of the well or recess portion 11, it can, in some instances, be located in a side wall of the well or recess.

The supplying of air under pressure to the interior of the tire and rim, forces the sealing ribs 24 and 25 axially into engagement with the side walls of the flanges 14 or 15, thereby preventing the escape of air from the assembly. In this regard it should be noted that the height of the integral portion 15A of the divided flange 15 is sufficient so that at least one continuous sealing rib 24 is engaged therewith and preferably more than one such rib is so engaged. Hence, the sealing action between the tire and rim is in a region such that no leakage of air can occur through any openings resulting from the division of the side flange. The height of the integral flange portion 15A to provide effective sealing action will of course, depend somewhat upon the diameter of the rims and upon the construction of the tire to be mounted thereon. Ordinarily, however, the height of the portion 15A should be in the order of one-half the total height of the side flange. For very large rims one-half the total height of the flange may be unnecessarily large for the height of the portion 15A but this value, in most cases, should not be less than three-quarters of an inch.

The presence of the integral portion 15A of the flange does not hamper ready mounting and dismounting of a tire since it is to be remembered that the rim also has the center well or recess 11 which facilitates passage of the beads over the flange portion 15A when the removable portion 15B of the flange is not in place as will be readily understood by those skilled in the use of drop center rims. Moreover, the height of the integral flange portion 15A need only be sufficient to provide effective air-sealing action between the tire beads and the rim and need not be sufficient to withstand all lateral forces exerted by the tire since these forces are borne, in part, by the portion 15B of the flange which is placed after the tire is mounted and which, together with the portion 15A, provides a side flange of conventional height.

Removal of the tire, mounted upon a rim as shown in Fig. 1, can be readily effected by releasing the air-pressure contained in the assembly and moving the bead 22 inwardly of the rim sufficiently to permit separation of the split, removable portion 15B from the integral portion 15A of the side flange 15. The tire beads are then removed over the remaining lower height integral flange portion 15A in a manner which will be readily understood by those skilled in the art of mounting and demounting tires.

Figure 2:
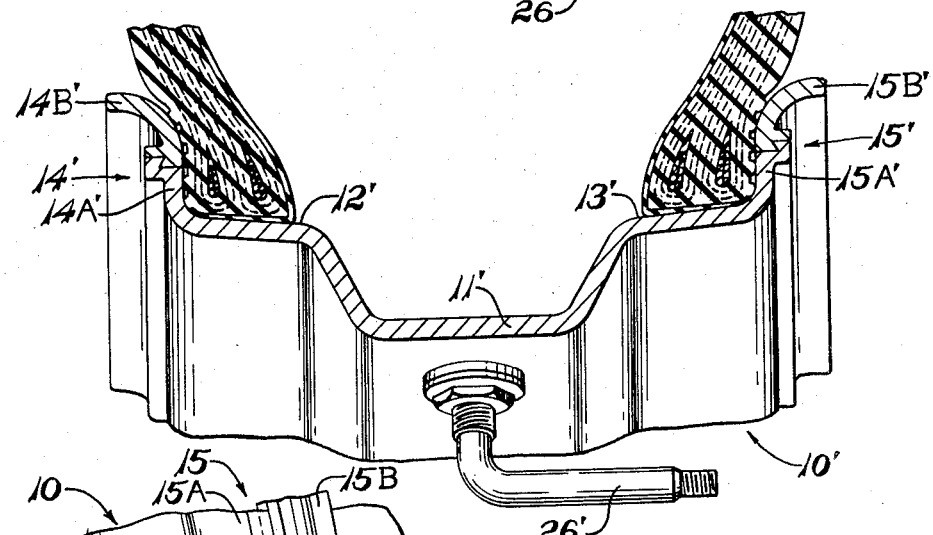
Fig. 2 is similar to Fig. 1 but shows an embodiment in which both side flanges of the rim are circumferentially divided.

The embodiment of the invention shown in Fig. 2 comprises a rim 10' substantially the same as the rim 10 in Figs. 1 and 3 and therefore has the same center well and bead seats together with the inflation valve, these parts being designated by the same numerals as used for similar parts in Fig. 1 but with a prime mark added. This embodiment differs from the embodiment shown in the Fig. 1 in that both side flanges 14' and 15' are circumferentially divided, the mode of division and shape of the removable portions 14B' and 15B' being the same as shown and described for the portion 15B in Fig. 1. In view of the similar nature of these parts, it is deemed unnecessary to describe their construction and operation in detail, it being readily appreciated that the purpose of providing both flanges with removable portions is to permit mounting or demounting a tire from either side of a wheel. In this embodiment, as in the embodiment shown in Fig. 1, sealing of the tire with the rim is effected by lateral engagement of the circumferentially extending beads in the tire with the integral portions of the side flanges, the removable portions of the flanges providing support against the lateral forces which the tire sustains during use.

The embodiment shown in Fig. 4 differs from the embodiments of Figs. 1 and 2 with respect to the shape of the interfitted surfaces of the integral and removable side flange portions. The rim is otherwise similar in shape and nature with that shown in Figs. 1 and 2 and hence only a portion of one bead seat and adjacent side flange are here shown. In the form of the rim illustrated in Fig. 4, the integral part 27 of the divided flange has an axially extending projection 28 that is formed with a circumferentially extending recess or gutter 29. The removable portion 30 of this side flange has an axially extending portion 31, the lower surface of which is provided with a circumferentially extending radially projecting rib or lip 32 which interfits and cooperates with the recess or gutter 29 to retain the removable portion in place on the rim. The removable side flange portion 30 is preferably radially split or divided similarly to the removable side flange portion 15B of the preferred embodiment and functions in a similar manner in the assembly. Likewise, the height of the integral flange portion 27 is sufficient to permit effective sealing action of the tire with this portion of the rim in the manner described for the other embodiments and hence this description and the mode of mounting and demounting of the tire need not be repeated. In the embodiment shown in Fig. 4, only one or both of the side flanges of the rim may have removable portions of the type illustrated and described.

The forms of the invention shown in Figs. 5, 6 and 7 differ from the previous embodiments only with respect to the manner in which the axially extending portions of the integral and removable parts of the side flange are formed to provide the complementary inter-engaging surfaces which retain the removable portion in place on the rim assembly. As shown in Fig. 5, the integral portion 33 of the rim is shaped substantially similar to the portion 27 shown in Fig. 4 except that the circumferentially extending recess or gutter 34 as here provided is shaped to receive the downwardly extending edge portion 35 of the removable side flange 36. In Fig. 6 the integral side flange portion 37 has the axially extending portion 38 thereof provided with a circumferentially extending groove or recess 39 which is substantially semi-circular in cross-section and is adapted to receive the radially projecting portion 40 on the axially extending part of the side flange 41 which projection 40 may be formed by a rolling or forging action forming a substantially U-shaped portion in the axial extending reach of the side flange 41. In the form of the rim shown in Fig. 7, the integral side flange portion 42 has an axially projecting portion 43 bent radially inwardly slightly intermediate its ends and with its outer edge portion turned upwardly to thereby provide a circumferentially extending recess 44 with a tapered lowered surface and a somewhat abrupt side surface adjacent its edge portion which mates with a complementarily shaped surface 45 provided on the axially extended portion of the removable side flange 46.

The several forms of rim structure shown in Figs. 4, 5, 6, and 7 function in substantially the same manner as do the forms shown in 1, 2 and 3 so that detailed descriptions thereof need not be provided. These forms of the invention illustrate various manners in which the removable rim portion and the mating portion of the integral side flange can be manufactured by rolling, bending, forging, or swaging operations to provide the interlocking surfaces for removable retention of the side flange upon the rim assembly. Other ways in which these mating surfaces may be formed, together with other modifications and variations of the structure, will be readily apparent to those skilled in the art after having been informed of the principles of this invention. Therefore, the invention is not to be considered as limited to the exact details of construction as herein illustrated and described, except as may be required by the spirit and scope of the appended claims.

Having thus described the invention, I claim:

1. A rim adapted to support a tubeless pneumatic tire and cooperate therewith to provide an air chamber, the said rim comprising a base portion air impervious except for an opening adapted to receive a valve in sealing relationship, said base portion having surfaces on either side of a circumferentially extending recess for receiving and supporting the radial inner surfaces of the tire beads, and generally radially extending side flange portions rising from said base portion adapted to engage the sides of the bead portions of the tire, at least one of said side flanges being circumferentially divided to provide a portion integral with said base portion and a removable portion, said flange portions including radially offset axially extending surfaces joined by generally radially extending shoulders engaging in axial abutting relationship, thereby releasably retaining the said removable portion in position as an extension of said integral portion, the radial extent of said integral flange portion not exceeding one-half of the total radial extent of the flange but being sufficient to provide air-sealing engagement with the side surface of the bead region of a tubeless tire when mounted on the rim and inflated.

2. A rim as defined in claim 1 wherein the said axially extending surfaces on said integral and removable flange portions are substantially cylindrical.

3. A rim as defined in claim 1 wherein said integral flange portion has a generally axially extending projection provided with a circumferential recess in its radially outer surface and said removable portion has a generally axially extending projection provided with a circumferentially extending portion projecting radially inward and receivable in said recess to provide the said interfitting surfaces.

4. A rim as defined in claim 1 wherein said integral flange portion has a generally axially extending projection provided with a circumferentially extending gutter and said removable portion has a circumferentially extending lip receivable in said gutter to provide the said interfitting surfaces.

5. A rim as defined in claim 1 wherein said removable flange portion is radially divided to facilitate placing and removal thereof.

6. A rim adapted to support a tubeless pneumatic tire and cooperate therewith to provide an air chamber, the said rim comprising spaced bead seats and an intermediate circumferentially extending recess, side flanges extending generally radially outwardly adjacent each bead seat and adapted to engage the sides of the bead portions of a tire mounted on the rim, at least one of said side flanges being circumferentially divided to provide a portion integral with the main portion of the rim and a removable portion, cooperating interfitting surfaces on the said integral and removable portions releasably retaining the said removable portion in position as an extension of said integral portion, the said interfitting surfaces including radially offset axially extending cylindrical surfaces joined by axially abutting radially extending undercut surfaces, the radial extent of the said integral portion of the divided flange not exceeding one-half the total radial extent of the flange but being sufficient to provide air-sealing engagement with the side surface of the bead region of a tubeless tire when mounted on the rim and inflated.

7. A rim as defined in claim 6 wherein the radial extent of said integral flange portion is at least three-quarters of an inch.

8. A drop-center rim adapted to support a tubeless pneumatic tire and cooperate therewith to provide an air chamber, the said rim comprising a base portion air impervious except for an opening adapted to receive a valve in sealing relationship, the said base portion having surfaces on either side of the central recess for receiving and supporting the radial inner surfaces of the tire beads, and generally radially extending side flange portions rising from said base portion and adapted to engage the sides of the bead portions of the tire, at least one of said side flanges being integral and the other of said flanges being circumferentially divided to provide a portion integral with said base portion and a removable portion, cooperating interfitting surfaces on said integral and removable flange portions releasably retaining the said removable portion in position as an extension of said integral portion, the said interfitting surfaces including radially offset axially extending cylindrical surfaces joined by axially abutting generally radially extending surfaces, the radial extent of said integral flange portion being in the order of one-half the total radial extent of the side flange to provide air-sealing cooperation with the side surface of the bead region of a tubeless tire when mounted on the rim and inflated while permitting ready passage thereover of a deflated tire.

9. A rim adapted to support a tubeless pneumatic tire and cooperate therewith to provide an air chamber, the said rim comprising a base portion air impervious except for an opening adapted to receive a valve in sealing relationship, the said base portion having surfaces on either side of a circumferentially extending recess for receiving and supporting the radial inner surfaces of the tire beads, and generally radially extending side flange portions rising from said base portion and adapted to engage the sides of the bead portions of the tire, each of said side flanges being circumferentially divided to provide a portion integral with said base portion and a removable portion, each integral flange portion and the associated removable portion including radially offset axially extending surfaces joined by generally radially extending shoulders engaged in abutting relationship for releasably retaining the removable portions in position as extensions of the integral portions, the radial extent of each of said integral flange portions not exceeding one-half the total radial extent of the flange of which it is a part but being sufficient to provide air-sealing engagement with the side surface of a tubeless tire mounted on the rim.

10. A rim as defined in claim 9 wherein the radial extent of the integral portion of each of said side flanges is at least three-quarters of an inch.

11. A tubeless tire and rim assembly comprising a rim having spaced bead seats on either side of a circumferentially extending recess and adjacent side flanges with at least one of the latter circumferentially divided to provide a portion integral with the main portion of the rim and a removable portion, an inflation controlling valve in said rim, said flange portions including interengaging radially offset axially extending surfaces joined by generally radially extending surfaces engaged in abutting relationship for releasably retaining the said removable portion in position as an extension of said integral flange portion, an annular inflatable tire including spaced beads with the said beads having their radial inner surfaces seated upon the said bead seats, and circumferentially extending sealing means on the outer side surfaces of the tire beads cooperating with said side flanges to provide an air-tight seal therebetween, the radial extent of the said integral portion of the divided flange being in the order of one-half the total radial extent of the flange to provide sealing cooperation thereof with a circumferentially continuous portion of said sealing means.

12. A tubeless tire and rim assembly as defined in claim 11 wherein the radial extent of said integral portion of the divided flange is at least three-quarters of an inch.

13. A tubeless tire and rim assembly as defined in claim 11 wherein said removable flange portion is radially split to facilitate placing and removal thereof.

14. A tubeless tire and rim assembly as defined in claim 11 wherein the said sealing means comprise circumferentially extending radially spaced sealing ribs on the outer surfaces of the tire beads cooperating with said side flanges to provide an air-tight seal therebetween, the radial extent of the integral portion of the divided flange being sufficient to engage and sealingly cooperate with at least one of the said sealing ribs.

15. A tubeless tire and rim assembly comprising a drop-center rim having spaced circumferentially extending bead seats and adjacent side flanges extending generally radially outwardly therefrom, an inflation controlling valve in said rim intermediate said bead seats, at least one of said side flanges being circumferentially divided into a portion integral with the adjacent bead seat and a removable portion, cooperating interfitting surfaces on the said integral and removable flange portions preventing axial outward movement of said removable portion when the surfaces are engaged, the said interfitting surfaces including radially offset axially extending cylindrical surfaces joined by axially abutting radially extending undercut surfaces, an annular inflatable tire including spaced beads with the said beads having their radial inner surfaces seated upon said bead seats, and circumferentially extending radially spaced sealing ribs on the outer surfaces of the tire beads cooperating with said side flanges to provide an air-tight seal therebetween, the radial extent of the integral portion of the divided flange being in the order of one-half the total radial extent of the flange to engage and sealingly cooperate with a plurality of the said sealing ribs.

References Cited in the file of this patent

UNITED STATES PATENTS

| | | |
|---|---|---|
| 1,330,061 | Dillet | Feb. 10, 1920 |
| 1,952,404 | Woodward | Mar. 27, 1934 |
| 2,149,205 | Brink | Feb. 28, 1939 |
| 2,537,624 | Brink | Jan. 9, 1951 |
| 2,587,470 | Herzegh | Feb. 26, 1952 |

FOREIGN PATENTS

| | | |
|---|---|---|
| 626,213 | France | May 7, 1927 |
| 412,731 | Great Britain | July 5, 1934 |